Fig. I.

INVENTORS
Anthony J. Mangold, Jr.
George M. Shera

INVENTORS
Anthony J. Mangold, Jr.
George M. Shera

BY Robert L. Lehman

AGENT

United States Patent Office 2,908,254
Patented Oct. 13, 1959

2,908,254

SHUTTER ASSEMBLY

Anthony J. Mangold, Jr., Cincinnati, and George M. Shera, Hamilton, Ohio, assignors to National Lead Company, New York, N.Y., a corporation of New Jersey Application December 2, 1955, Serial No. 550,583

1 Claim. (Cl. 126—200)

This invention relates to a shutter assembly. More specifically, it relates to a magnetically operated, vacuum-tight shutter assembly for use in vacuum furnaces and the like.

Satisfactory operation of vacuum melting equipment requires periodic visual inspection by the operator who must have an unobscured view of the melt to produce uniform results and to obtain necessary operating data. The usual practice has been to incorporate a sight glass for this purpose. Present equipment allows particles of superheated metal and slag, thrown up from the melt, to impinge on the surface of the glass and cause pitting and obscuring of the surface so as to prevent accurate determination of temperature by optical means as well as visual inspection of the melt. In order to overcome this situation, wipers and similar devices have been employed for removing the metal and slag from the sight glass. These have been activated by mechanical linkages which, in a short time allow leakage, due to movement through the seal, and decrease the vacuum. Also the surface of the glass soon becomes so obscured that replacement is necessary and this operation requires that the furnace be idle during this period.

An object of this invention, therefore, is to provide a shutter assembly which may be employed to prevent the accumulation of metal particles and slag on the glass and subsequent pitting of the glass. Another object is to provide a remotely operated shutter assembly for shielding a sight glass whereby the effective life of the sight glass, as installed, will be materially increased. Still another object is to provide an integrated, air-tight shutter assembly which will insure maintenance of a high degree of vacuum in the melting equipment.

These and other objects will become apparent from the following more complete description of the invention and the annexed drawings wherein.

Figure 1:
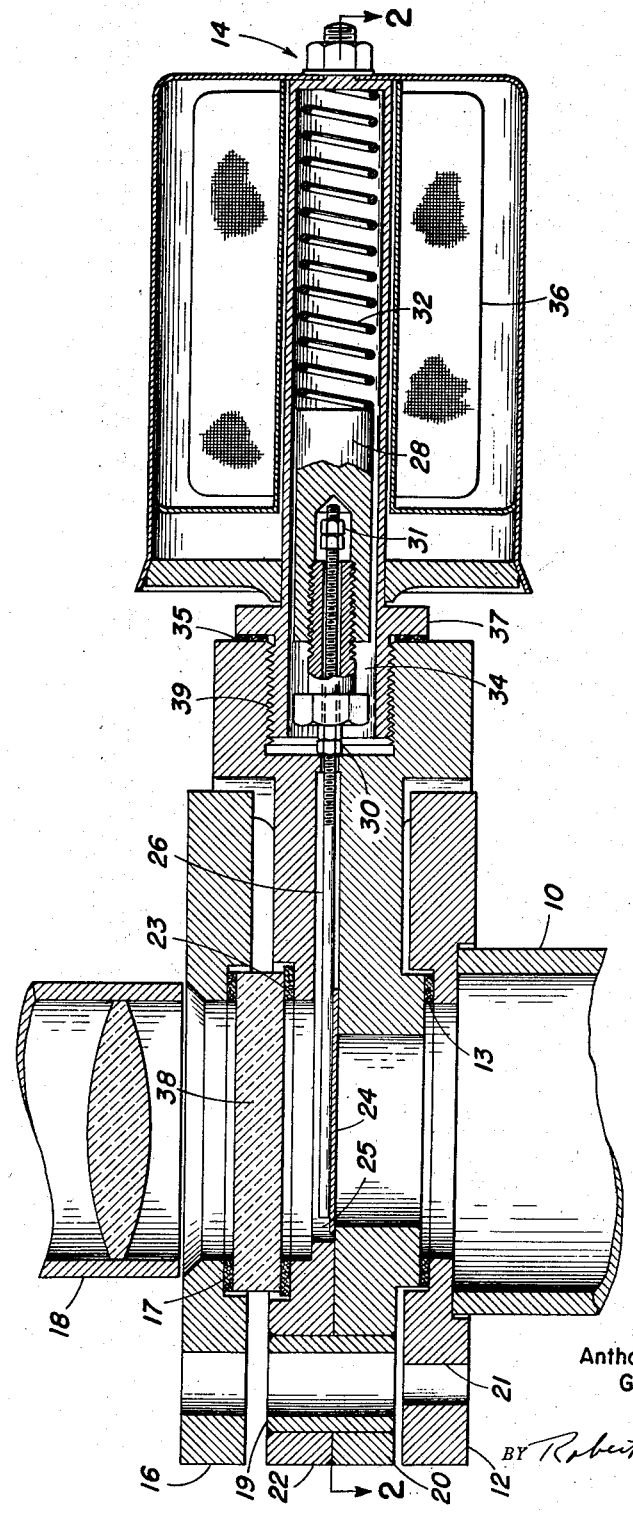
Figure 1 shows a sectional view of the side elevation of a typical shutter assembly for accomplishing the aforementioned objectives.

Referring now to Figure 1, the shutter assembly 14 is shown in place disposed between lower sight tube flange 12, which is fixedly attached to lower sight tube 10, and upper sight tube flange 16, which is affixed to upper sight tube 18. More specifically, the shutter assembly consists, in part, of bottom flange 20, the bottom surface of which has a projecting shoulder arranged to provide a snug fit in the recess of lower sight tube flange 12 and which has an annular space or view port in the center for viewing purposes. Permanently affixed by suitable means to the bottom flange 20 is top flange 22 which has a circular recess in the top surface to accommodate sight glass 38, a substantially rectangular recess in the lower surface to allow the free longitudinal movement of shutter 24 and an annular space between the two recesses for viewing purposes. To one end of shutter 24 and extending therefrom is shutter rod 26. Movably mounted on shutter rod 26 is slug 28. The movement of said slug 28 upon said shutter rod 26 is limited by the stops 30 and 31 which are fixedly attached to shutter rod 26. Slug tube 34 is provided with a cylindrical space in which shutter rod 26 freely moves longitudinally, restricted only by spring 32. Slug tube 34 is sealed to bottom flange 20 and top flange 22 at point 35 by means of shoulder 37 and threaded portion 39, or by such other suitable means as are known to those versed in the art. Activating means for moving the slug 28 is provided by solenoid 36 which fits on the outside of slug tube 34 and is held in place by suitable fasteners. An air-tight seal is provided at points 13, 17 and 23 by gaskets or other suitable material.

Figure 2:
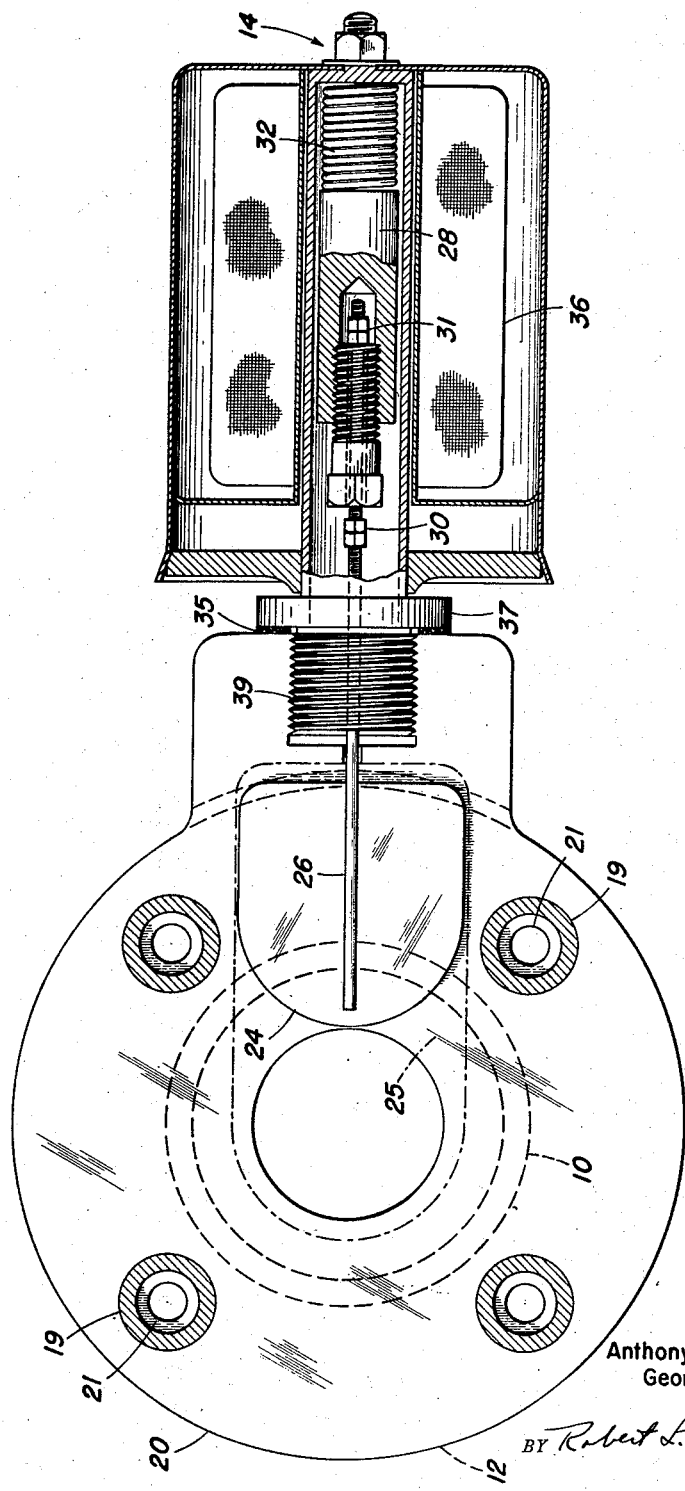
Figure 2 shows a general top view of the apparatus presented in Figure 1.

Figure 2 shows shutter 24 in the open or withdrawn position. When the shutter is in the closed or extended position, the semicircular edge of the shutter is in intimate contact with surface 25 of the lower recess of top flange 22. Also shown are holes 19 through which pass bolts or other suitable fasteners for attaching the shutter assembly to the upper and lower sight tube flanges. Bushings 21 are fixedly attached in holes 19 in order to provide an air-tight seal.

The drawings show how shutter 24 is fixedly attached to one end of shutter rod 26. Near the other end of shutter rod 26, slug 28 is movably mounted. Its motion upon said shutter rod 26 being limited by stops 30 and 31 which are affixed to shutter rod 26. Spring 32 provides the means by which shutter 24 is kept in the normally closed position. This spring is loaded during the opening movement of the shutter.

In operation, the shutter is normally in the closed or extended position thus protecting the surface of the sight glass from fumes, dirt and occluded metal particles which tend to attack the glass and thereby decrease its transparency. When the operator wishes to view the melt he, by pushbutton or other suitable means, closes the electrical circuit which energizes the solenoid. The magnetic flux passes through the slug tube, which is composed of a nonmagnetic metal, to the slug. The magnetic flux causes the slug to move toward the more intensive field of the magnet. The slug strikes the end stop and as it moves farther into the field of the magnet, the shutter is moved into the open or retracted position, its motion being limited, according to a typical construction, by the contact of the edge of the shutter with the edge of the recess in which the shutter fits. At the same time, the slug is forced against the spring compressing and loading it. The shutter is held in the open position as long as the solenoid is energized by the electric circuit. When the operator has finished viewing the melt, he opens the electric circuit which denergizes the magnet. At this time there is no magnetic flux to hold the slug in the open position so the expanding force of the loaded spring acts against the shutter rod and moves the shutter into its normally closed position.

By utilizing vacuum melting equipment having the shutter assembly interposed in the sight tube between the furnace and the sight glass, according to the present invention, the sight glass is kept free of slag and particles of molten metal. Since dirt and metal cannot become deposited on the glass, to any significant degree, the effective life of each glass is greatly increased which in turn decreases the down time of the furnace due to sight glass replacement.

The apparatus of the present invention is simple to install and economical to operate and maintain. In addition, with the apparatus of the present invention, a high degree of vacuum can be maintained in the furnace since there are no gland type seals, as generally used prior to this invention, to develop leaks.

While this invention has been described and illustrated by the examples shown, it is not intended to be strictly limited thereto and other modifications and variations may be employed within the scope of the following claim.

We claim:

Assembly for protecting the sight glass in a vacuum melting furnace which comprises a housing adapted for air-tight installation in a viewing tube, said housing comprising a viewing section having a view port extending therethrough, the upper surface of said viewing section having a recess therein, a sight glass disposed in said recess, a shutter rod housing section sealably joined in an air-tight manner to said viewing section, a shutter receiving recess in the shutter rod housing section, a shutter assembly within said shutter rod housing section comprising a slidably movable shutter disposed in said shutter rod recess, a shutter rod affixed to one end of said shutter and extending therefrom, a pair of stops fixedly positioned on the other end of said shutter rod, a slug movably mounted on said shutter rod, between said stops and a spring positioned between the slug and the shutter rod housing, said spring acting to move said shutter from said shutter rod recess to cover said view port and magnetic activating means comprising a solenoid disposed around the said slug, said magnetic activating means acting to move the shutter from a position covering the view port into the shutter receiving recess.

References Cited in the file of this patent

UNITED STATES PATENTS

| | | |
|---|---|---|
| 1,275,975 | Murdock | Aug. 13, 1918 |
| 2,125,021 | Haynes | July 26, 1938 |
| 2,401,443 | Weinrich | June 4, 1946 |
| 2,510,201 | Summey | June 6, 1950 |
| 2,512,776 | Queen | June 27, 1950 |

FOREIGN PATENTS

| | | |
|---|---|---|
| 910,405 | France | Jan. 28, 1946 |